United States Patent [19]

Bulat et al.

[11] Patent Number: 5,557,631
[45] Date of Patent: Sep. 17, 1996

[54] SONIC FURNACE MONITORING APPARATUS

[75] Inventors: Vladimir Bulat, Markham; Bosko Madic, Whitby; David Bowden, Oshawa; Stan Titan, Whitby, all of Canada

[73] Assignee: Dynex Engineering Inc., Whitby, Canada

[21] Appl. No.: 239,560

[22] Filed: May 6, 1994

[51] Int. Cl.⁶ .................................................. H05B 7/148
[52] U.S. Cl. ........................ 373/105; 266/80; 266/86
[58] Field of Search .............................. 373/2, 60, 104, 373/105, 106; 75/12, 60; 73/290 V; 266/80, 86, 226

[56] References Cited

U.S. PATENT DOCUMENTS

| | | | |
|---|---|---|---|
| 3,549,139 | 12/1970 | Marxen | 266/226 |
| 3,701,518 | 10/1972 | Herff | 266/86 |
| 3,817,502 | 6/1974 | Taylor | 266/90 |
| 4,514,218 | 4/1985 | Inagaki | 75/10.12 |
| 4,530,102 | 7/1985 | Baker et al. | 266/86 |
| 4,675,057 | 6/1987 | Pfaffmann et al. | 266/90 |
| 4,695,042 | 9/1987 | Kudou | 266/226 |

Primary Examiner—Tu Hoang
Attorney, Agent, or Firm—Richard C. Litman

[57] ABSTRACT

Apparatus and method for obtaining accurate sonic input data from a metallurgical furnace, for accomplishing accurate control of a lance injecting oxygen and/or other substances into the melt. A remotely located hydrophone is placed in sonic communication with a liquid circuit cooling the lance. Sound levels and frequencies are picked up through the liquid, and transmitted to a programmable logic controller which generates control signals operating the lance. An associated real time analyzer compares the sonic signature of the input data to predetermined sonic signature data retained in memory, and adjusts lance operation through the programmable logic controller accordingly in order to operate the furnace optimally. Sonic transmission is more accurate, and the hydrophone is more protected from the harsh furnace environment due to its remote location and employment of liquid sound transmission, when compared to other microphone arrangements.

7 Claims, 3 Drawing Sheets

SONIC FURNACE MONITORING APPARATUS

BACKGROUND OF THE INVENTION

1. Field of the Invention

The present invention relates to method and apparatus for inferring position of an oxygen lance within the molten metal environment of an electric arc furnace or the like. Position is inferred by comparing sound characteristics actually encountered with predetermined sound characteristics typical of the various operating stages and conditions of the metal making process.

2. Description of the Prior Art

In furnaces for making steel from a metal charge such as steel scrap, a lance for injecting an oxidant gas, such as oxygen, is employed to speed up the melting process, to reduce refining time, to create a foamy slag, and to influence characteristics of the final steel composition. Oxidant injection is preferably conducted at precise locations with respect to the level of molten metal and slag within a furnace. It is necessary to adjust the position of the lance from time to time during this process, as to compensate for greater or lesser quantities of metal and slag in the furnace due to material addition and withdrawal, or to control the rate of injection of oxidant as may be appropriate.

Direct observation of the level of a molten metal stratum existing within the furnace is nearly impossible. Severe heat, violent currents of vapors above the liquid phase, and roiling of the liquids present all obstruct observation. Traditionally, the industry has relied in part upon the experience of a human operator to adjust position. The operator may be assisted by a technique such as analysis of gas escaping from the furnace, which may lead to inferences relating to relevant conditions existing within the furnace.

The prior art has attempted to further the effectiveness of methods of observing internal furnace conditions, and the following two examples are based upon monitoring sonic characteristics. U.S. Pat. No. 4,530,102, issued to Steven S. Baker et al. on Jul. 16, 1985, discloses a method of controlling lance position by recording and analyzing sonic emissions from a steel furnace. A directional microphone is located outside the furnace, and is aimed theretowards. Sonic emissions are monitored and compared to sonic characteristics which are predetermined to correlate to various possible furnace conditions. The lance is then adjusted as appropriate in light of the comparison.

U.S. Pat. No. 3,701,518, issued to Louis M. Herff on Oct. 31, 1972, provides a method of controlling lance immersion by radar. An electromagnetic wave is generated and transmitted into the melt from the lance. This wave is reflected from a furnace surface back to a receiver, which may also be located within the lance. The characteristics of the received waves are then employed to derive inferences regarding existing conditions within the furnace, and the lance is adjusted accordingly.

SUMMARY OF THE INVENTION

The present invention relies upon sonic monitoring of furnace conditions, and improves on the accuracy of picking sonic inputs. Two analytic techniques are employed to derive useful data from the sonic inputs. In the first technique, amplitude is compared against frequency. In the second technique, amplitude is compared with real time, which monitors evolving conditions within the furnace. The data thus derived are compared to predetermined acoustic characteristics, which are preferably derived from empirical data recorded under controlled conditions. Thus, the two types of data include the predetermined data, serving as a standard for comparison purposes, and referred to hereinafter as "predetermined" data, and empirical data taken during actual operation of the furnace, which latter data will be referred to hereinafter as "operating" data. Operating data are compared to predetermined data, and appropriate control signals are generated for controlling the oxygen lance. The sum total of all sonic characteristics obtained at any one point in time pinpoints and encompasses all relevant operating conditions, and will be termed a sonic signature.

Correlation of operating data to predetermined data reveals important conditions existing within the furnace during steel making, and appropriate adjustment of the oxygen lance, to improve steel production, is made accordingly. Although lances for injecting oxygen are the most frequently encountered type, the same principles apply to lances for injecting other materials, such as lime and carbon sources. The oxygen lance may be inserted deeper into the melt, or may be partially or fully withdrawn therefrom. Also, the rate of oxygen injection may be controlled. In those processes wherein a fuel, such as natural gas, is injected as well as oxygen, rate of fuel injection may be adjusted.

The improvement in reading the sonic signature according to the present invention takes advantage of employing a dense medium, that being liquid coolant, to conduct sound. Moreover, this medium enjoys closer proximity to the subject process, since it flows through the lance, which is within the furnace.

The hydrophone, an instrument for detecting sound transmitted through a liquid medium, may be located at somewhat great distance from the furnace. This is desirable because a furnace provides a harsh operating environment for a sensitive instrument. Heat, vibration, dust, and motion of exhaust gasses and other materials all act to degrade the physical condition and operating accuracy of any type of sound pick up and transmitting instrument.

While relative isolation of a microphone from the furnace protects the microphone, such isolation, and self-induced resonant distortion of sound, may impede accuracy of sonic detection. This is a drawback to remotely located microphones employing air as the sonic transmission medium, as illustrated in patent '102 to Baker et al.

The novel hydrophone arrangement works in conjunction with a real time frequency analyzer and a programmable logic controller, referred to hereinafter as "PLC". The frequency analyzer converts raw data obtained from the hydrophone to the PLC. The necessary data comparisons are made, and appropriate control signals are generated by the PLC. The control signals are based upon predetermined desired conditions, as reflected by recorded, predetermined sonic signatures of the furnace under all conditions. The PLC is programmed to bring actual operating conditions into accordance with the predetermined desired conditions by making adjustments to operation of the oxygen lance.

Based upon data obtained by experimentation, applicants have established that sonic frequencies of interest lie within the range of 100 Hz and 22.4 kHz. In an electric arc furnace, the primary source of sound is the igniting and changing of electrical arcs at electric utility network frequency and by the charging material moving as it melts. Frequencies of about twice network frequency, or 120 Hz, are thus most frequently encountered.

By comparison, the combustion roar of gas burners typically occupies a band of frequencies between 250 and 500

Hz. External intruding sonic events frequently encountered in an industrial setting, such as cranes, forklifts, and other equipment will generally be limited to frequencies below 200 Hz.

Gas jets may cause sounds within a frequency range of 100 Hz and 5 kHz. When a gas jet impinges upon a hard obstacle, such as a piece of solid or unmelted charging material, such as steel scrap, noise level increases, particularly in the higher frequencies.

Amplitudes of the sound tend to be higher when slag depth is low, and decrease as slag builds up, absorbing sound.

Accordingly, it is a principal object of the invention to provide a sonic control system for controlling a lance injecting a material into a metallurgical furnace which employs a liquid coolant as a sound transmitting medium.

It is another object of the invention to employ a preexisting liquid cooling circuit as a sonic transmitting medium.

It is a further object of the invention to locate a sound pickup device remotely from the subject furnace.

Still another object of the invention is to consider sonic characteristics such as frequency and amplitude in the light of passage of real time, when generating lance control signals.

An additional object of the invention is to control the degree of penetration of a lance into the melt of a metallurgical furnace.

It is again an object of the invention to control the rate of injection from a lance of substances affecting composition or properties of the resultant metal product of a metallurgical furnace.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
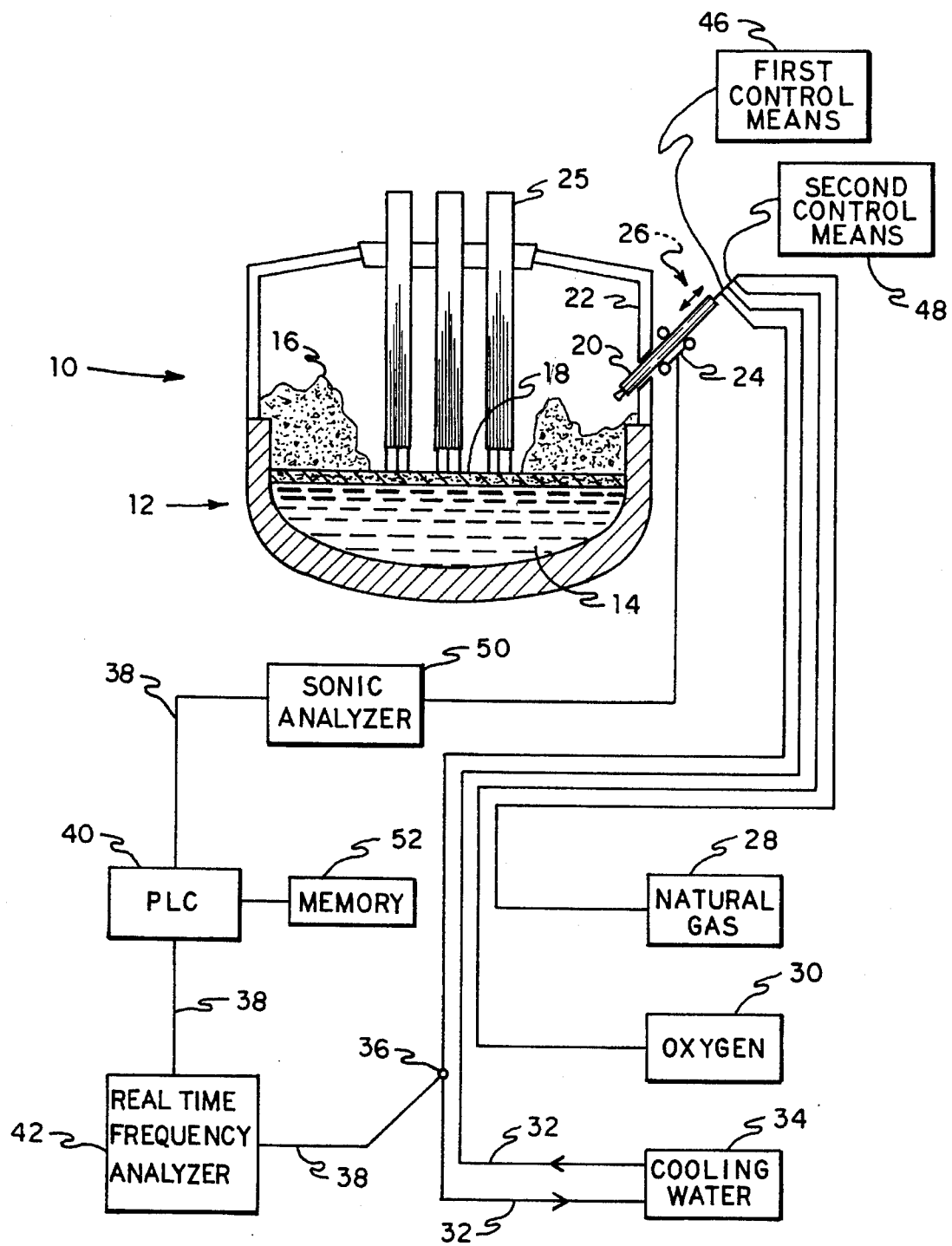
FIG. 1 is a diagrammatic representation of the invention, as applied to an electric arc furnace.

Turning now to FIG. 1 of the drawings, the invention is shown in operable relation to a metallurgical furnace, such as electric arc furnace 10. Furnace 10 is shown in operation, there being a melt 12 contained therein, including a lowermost layer of molten metal 14, a layer of slag 18 floating on thereon, and a charging material, such as steel scrap 16, melted by electrodes 25. A lance 20 penetrates one wall 22 of furnace 10, and is connected to a lance drive 24 which inserts and withdraws lance 20 into and from melt 12.

In the example illustrated in FIG. 1, lance 20 is seen to penetrate the furnace wall. It would be equally effective to penetrate the furnace roof or a slag door. Lance 20 injects both oxygen and natural gas, and includes valves 26 for controlling injection rates of both of these substances. Lances may supply just one of these substances, or still other substances to a melt, and the principles set forth herein apply regardless of the precise nature of lance. Both lance drive 24 and valves 26 are conventional and hydraulically, pneumatically, or electrically controlled by first controller 46 and second controller 48, and will not be described further.

Lance 20 conducts three fluids. Natural gas and oxygen are obtained from respective pressurized natural gas and oxygen supplies 28,30. Both substances are injected into melt 12 as appropriate for the process. A cooling circuit 32 containing water flows through lance 20, and is connected to a source of relatively chilled water 34. The cooling system may be of a type wherein water is cooled and recirculated, or of the type wherein fresh, relatively cool water is obtained, and heated water is disposed.

Located along cooling circuit 32, and preferably remote from the harsh environment of furnace 10, a hydrophone 36 is attached to one conduit of cooling circuit 32. Hydrophone 36 is suitably attached so as to be in effective sonic communication with the cooling water, and to transmit the same with minimal distortion and outside interference. A miniature hydrophone manufactured by Bruel & Kjaer, designated model 8103, was found to perform satisfactorily in experimentation. Bruel & Kjaer is based in Naerum, Denmark, and maintains U.S. corporate offices at 2364 Park Central Boulevard, Decatur, Ga. 30035. Sound energy obtained from hydrophone 36 provides a sonic input transmitted through data transmission cables 38 to a sonic analyzer, such as real time frequency analyzer 42. Sonic analyzer 42 is connected to computer means, such as programmable logic controller (PLC) 40.

Real time frequency analyzer 42 adds the ability to process data with respect to the passage of real time. Experimentation has shown that an analyzer, also manufactured by Bruel & Kjaer, and designated model 2140, which employs Bruel & Kjaer software, commercially available as "QCMASK", has served well in the capacity of a real time analyzer.

PLC 40 includes memory 52 into which has been loaded data corresponding to predetermined, prerecorded sonic signatures of furnace 10 in operation. Raw data obtained from hydrophone 36 is conditioned by real time frequency analyzer 42, and processed within PLC 40 to generate control signals for operating lance drive 24 and oxygen and natural gas valves 26, therefore controlling both lance position and substance injection. The control signals are generated responsive to comparison of operating sonic signature data to predetermined sonic signature data stored in memory 52.

Figure 2:
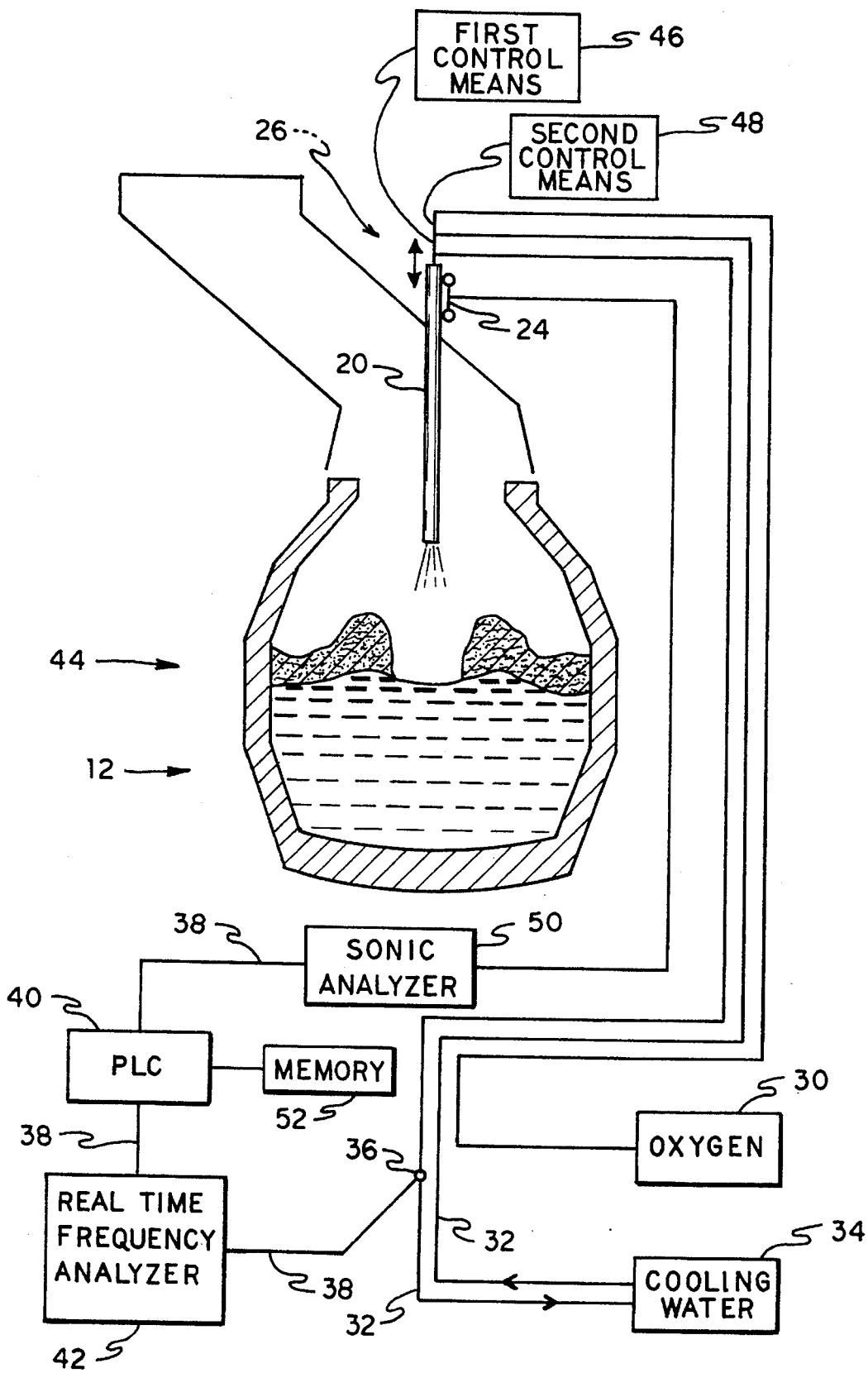
FIG. 2 is a diagrammatic representation of the invention, as applied to a basic oxygen furnace.

FIG. 2 illustrates that the same system may be employed in a basic oxygen furnace 44, or still other metallurgical furnaces, as well as with an electric arc furnace despite different physical configurations. FIG. 2 also shows that oxygen only is employed as an injected substance, but this is of little consequence to the inventive concept. The sonic signatures will differ, but will exist nonetheless and will be sufficiently distinct and characteristic of the selected furnace so as to be equally usable to derive input data for the control process.

Figure 3:
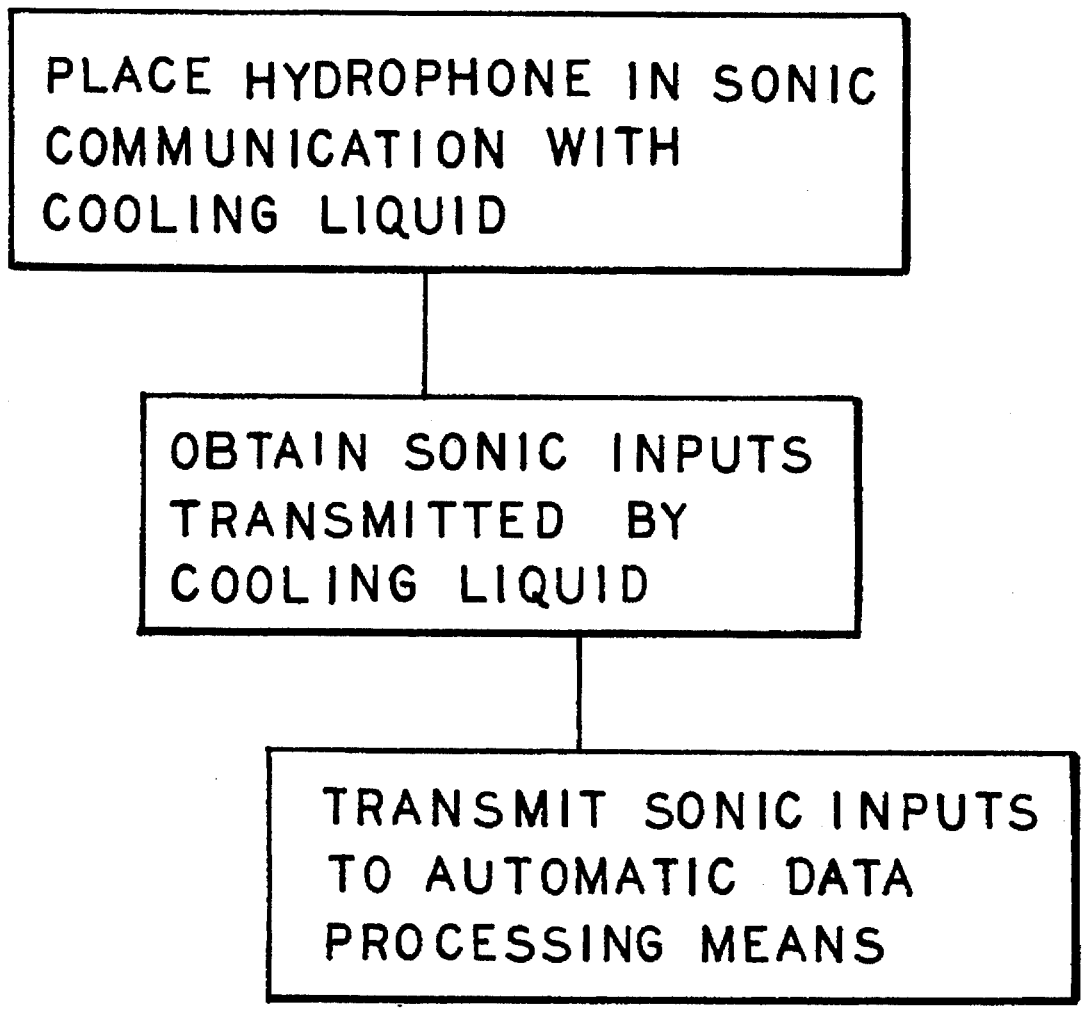
FIG. 3 is a block diagram summarizing the steps of the method of practicing the invention.

Steps of a method of practicing the present invention are summarized in FIG. 3, reading from the top downwardly. First, the hydrophone is placed in sonic communication with the sound source by immersion in the cooling liquid. Next, sonic inputs are detected by hydrophone. Then, the sonic inputs are transmitted to the sonic analyzer. Desired control of the lance then proceeds as outlined hereinabove.

It is to be understood that the present invention is not limited to the embodiments described above, but encompasses any and all embodiments within the scope of the following claims.

We claim:

1. A sonic control system, in a metallurgical furnace including a lance, a lance drive, and a liquid cooling circuit, for controlling a lance cooled by a liquid cooling circuit and driven by a lance drive, the lance injecting at least one substance into the melt of the metallurgical furnace for speeding up the melting process, to reduce refining time, to create foamy slag, and to improve the resultant metal composition, said sonic control system comprising:

a hydrophone mounted in sonic communication with said liquid cooling circuit, for obtaining a sonic input from said metallurgical furnace;

a sonic analyzer having data transmission means linking said sonic analyzer to said hydrophone and linking said sonic analyzer to computer means;

said computer means including memory means for storing predetermined sonic signature data;

said computer means for converting the sonic input from said hydrophone to an operating sonic signature data, for comparing the predetermined sonic signature data to the operating sonic signature data and thereby generating first control signals responsive thereto; and first control means for operating said lance drive responsive to said first control signals.

2. The sonic control system according to claim 1, said sonic analyzer further including a real time analyzer, for processing sonic input data in real time.

3. The sonic control system according to claim 1, further including second control means for regulating injection of the at least one substance, said computer means further generating second control signals responsive to comparing the predetermined sonic signature data to the operating sonic signature data, said second control signals controlling said second control means.

4. A sonic control system, in a metallurgical furnace including a lance, a lance drive, and a liquid cooling circuit, for controlling a lance cooled by a liquid cooling circuit, the lance injecting at least one substance into the melt of said metallurgical furnace for improving the resultant metal composition, there being injection control means for controlling the rate of substance injection, said sonic control system comprising:

a hydrophone mounted in sonic communication with said liquid cooling circuit, for obtaining a sonic input from said metallurgical furnace;

a sonic analyzer having data transmission means linking said sonic analyzer to said hydrophone and linking said sonic analyzer to computer means;

said computer means including memory means for storing predetermined sonic signature data;

said computer means for converting the sonic input from said hydrophone to an operating sonic signature data, for comparing the predetermined sonic signature data to the operating sonic signature data and thereby generating first control signals responsive thereto; and first control means for operating said injection control means responsive to said first control signals.

5. The sonic control system according to claim 4, said sonic analyzer further including a real time analyzer, for processing sonic input data in real time.

6. A method of providing sonic inputs to a control system for controlling a lance of a metallurgical furnace, the lance cooled by a cooling liquid, comprising the steps of:

a) placing a hydrophone in sonic communication with the cooling liquid;

b) obtaining sonic inputs transmitted through the cooling liquid; and c) transmitting sonic inputs obtained in step b) to automatic data processing means for generating control signals responsive to sonic inputs.

7. The method of claim 6, wherein the step of placing a hydrophone in sonic communication with the cooling liquid further comprises the step of:

placing a hydrophone in sonic communication with a sound source by direct immersion of the hydrophone within the cooling liquid.

\* \* \* \* \*